United States Patent
Kinoshita et al.

(10) Patent No.: US 9,970,428 B2
(45) Date of Patent: May 15, 2018

(54) MOTOR DRIVEN COMPRESSOR

(71) Applicant: KABUSHIKI KAISHA TOYOTA JIDOSHOKKI, Kariya-shi, Aichi-ken (JP)

(72) Inventors: Yusuke Kinoshita, Kariya (JP); Ken Suitou, Kariya (JP); Kazuhiro Kuroki, Kariya (JP); Yumin Hishinuma, Kariya (JP); Junichi Takahata, Kariya (JP); Junya Yano, Kariya (JP); Takuro Mizuno, Kariya (JP)

(73) Assignee: KABUSHIKI KAISHA TOYOTA JIDOSHOKKI, Kariya-shi, Aichi-ken (JP)

( * ) Notice: Subject to any disclaimer, the term of this patent is extended or adjusted under 35 U.S.C. 154(b) by 336 days.

(21) Appl. No.: 14/444,290

(22) Filed: Jul. 28, 2014

(65) Prior Publication Data
US 2015/0037179 A1 Feb. 5, 2015

(30) Foreign Application Priority Data
Jul. 30, 2013 (JP) .................................. 2013-157991

(51) Int. Cl.
*F04B 39/00* (2006.01)
*H02K 5/04* (2006.01)
(Continued)

(52) U.S. Cl.
CPC .......... *F04B 39/0033* (2013.01); *F04B 35/04* (2013.01); *F04B 39/121* (2013.01);
(Continued)

(58) Field of Classification Search
CPC . F04D 25/0693; H02K 11/33; F04C 18/0215; F04C 23/008; F04B 35/04; F04B 27/0873; F04B 39/121
(Continued)

(56) References Cited

U.S. PATENT DOCUMENTS 6,619,933 B2 *  9/2003  Ikeda .................. F04B 39/06
                                                 417/410.1
9,017,045 B2 *  4/2015  Kinoshita ............ F01C 21/10
                                                 417/410.1
(Continued)

FOREIGN PATENT DOCUMENTS

JP    H04105951    *  9/1992
JP    H04105951 U    9/1992
(Continued)

OTHER PUBLICATIONS

Translation of JPH04-105951, Takayama, "Cylinder Head Cover Mounting Device", Sep. 11, 1992.*

(Continued)

*Primary Examiner* — Devon Kramer
*Assistant Examiner* — Lilya Pekarskaya
(74) *Attorney, Agent, or Firm* — Sughrue Mion, PLLC

(57) ABSTRACT

A motor-driven compressor includes a metal housing accommodating a compression unit and an electric motor and a resin cover coupled to the housing. The cover and the housing define an accommodation chamber that accommodates a motor driving circuit that drives the electric motor. A metal shield is fixed to the cover and blocks electromagnetic noise. The shield and the cover are stacked together. A sealing member located between the shield and the cover. The sealing member is configured to block entry of foreign matter into the accommodation chamber through a gap between the shield and the cover.

5 Claims, 3 Drawing Sheets

(51) Int. Cl.
*F04B 35/04* (2006.01)
*F04B 39/12* (2006.01)
*F04B 39/14* (2006.01)
*F04C 23/00* (2006.01)
*F04C 18/02* (2006.01)

(52) U.S. Cl.
CPC .......... *F04B 39/14* (2013.01); *F04C 18/0215* (2013.01); *F04C 23/008* (2013.01); *H02K 5/04* (2013.01); *F04C 2240/30* (2013.01); *F04C 2240/403* (2013.01); *F04C 2240/803* (2013.01); *F04C 2240/805* (2013.01); *F04C 2240/808* (2013.01); *F04C 2270/11* (2013.01); *F05C 2201/021* (2013.01)

(58) Field of Classification Search
USPC .................. 417/410.1; 310/68 R, 44; 403/21
See application file for complete search history.

(56) References Cited

U.S. PATENT DOCUMENTS

| | | | | |
|---|---|---|---|---|
| 2004/0009078 A1* | 1/2004 | Kimura | ................ | F04C 23/008 417/410.5 |
| 2009/0010786 A1* | 1/2009 | Koide | .................... | F01C 21/10 417/423.14 |
| 2010/0074772 A1* | 3/2010 | Hoshino | ................. | F04B 35/04 417/410.1 |
| 2010/0143074 A1* | 6/2010 | Sumiya | ................... | F02F 7/006 411/411 |
| 2010/0183457 A1 | 7/2010 | Hattori et al. | | |
| 2011/0189035 A1* | 8/2011 | Nakagami | ............... | F04B 39/06 417/410.5 |
| 2012/0237376 A1 | 9/2012 | Kinoshita et al. | | |
| 2014/0037470 A1 | 2/2014 | Kinoshita et al. | | |
| 2014/0134017 A1 | 5/2014 | Yano et al. | | |

FOREIGN PATENT DOCUMENTS

| | | |
|---|---|---|
| JP | 2008-215236 A | 9/2008 |
| JP | 2009-257292 A | 11/2009 |
| JP | 2012-193660 A | 10/2012 |

OTHER PUBLICATIONS

Communication dated Sep. 3, 2015 from the Korean Intellectual Property Office in counterpart application No. 10-2014-0094547.
Communication dated Oct. 28, 2014, issued by the European Patent Office in counterpart Application No. 14178735.8.

\* cited by examiner

MOTOR DRIVEN COMPRESSOR

BACKGROUND OF THE INVENTION

The present invention relates to a motor-driven compressor.

A motor-driven compressor includes a metal housing accommodating a compression unit, which compresses and discharges refrigerant, and an electric motor, which drives the compression unit. A cover that defines an accommodation chamber is coupled to the housing. The accommodation chamber accommodates a motor driving circuit that drives the electric motor.

When the cover is made of metal, the overall weight of the motor-driven compressor increases. The use of a resin cover allows the motor-driven compressor to be lighter. However, a resin cover would transmit electromagnetic noise from outside the compressor to the motor driving circuit. In addition, electromagnetic noise from the motor driving circuit may leak out of the compressor through the resin cover.

Accordingly, Japanese Laid-Open Patent Publication No. 2008-215236 discloses an insulating layer (resin cover), which is made of an insulating material such as resin and rubber, and a conductive layer (shield), which is made of a conductive material such as aluminum and iron. The insulating layer and the conductive layer, which are layered and fixed to each other, are coupled to a housing by a bolt, with the conductive layer in contact with the housing. Electromagnetic noise from the exterior is blocked by the conductive layer and transmitted to the housing. This suppresses electromagnetic noise entering the accommodation chamber through the insulating layer. In addition, electromagnetic noise from the motor driving circuit is blocked by the conductive layer and transmitted to the housing. This suppresses the leakage of electromagnetic noise from the motor driving circuit to the exterior through the insulating layer.

However, the sealing between the conductive layer and the insulating layer is insufficient in the '236 publication. This may result in foreign matter such as water and dust entering the accommodation chamber from between the conductive layer and the insulating layer.

SUMMARY OF THE INVENTION

It is an object of the present disclosure to provide a motor-driven compressor that blocks entry of foreign matter into an accommodation chamber through a gap between a shield and a resin cover.

To achieve the above object, one aspect of the present invention is a motor-driven compressor including a metal housing accommodating a compression unit and an electric motor and a resin cover coupled to the housing. The cover and the housing define an accommodation chamber that accommodates a motor driving circuit that drives the electric motor. A metal shield is fixed to the cover and blocks electromagnetic noise. The shield and the cover are stacked together. A sealing member located between the shield and the cover. The sealing member is configured to block entry of foreign matter into the accommodation chamber through a gap between the shield and the cover.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE INVENTION

Figure 1A:
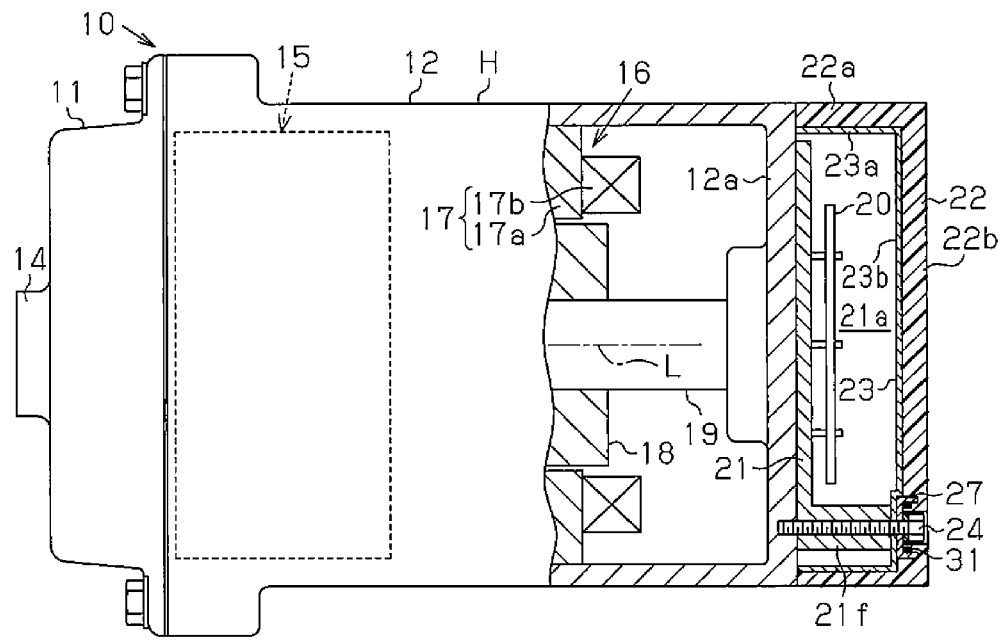
FIG. 1A is a partially cross-sectional view showing a motor-driven compressor of one embodiment.
Figure 1B:
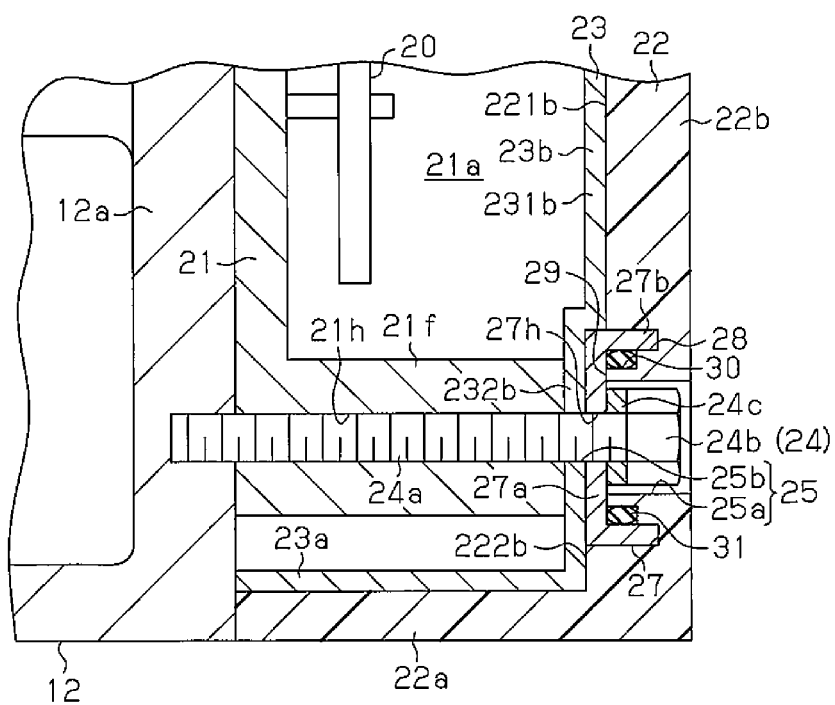
FIG. 1B is an enlarged cross-sectional view showing a bolt in the motor-driven compressor of FIG. 1A.

Referring to FIGS. 1A and 1B, a motor-driven compressor of one embodiment will now be described.

As shown in FIG. 1A, a motor-driven compressor 10 includes a housing H that includes a cylindrical discharge housing member 11 and a cylindrical suction housing member 12 coupled to the discharge housing member 11. The discharge housing member 11 and the suction housing member 12 are made of a metal, preferably aluminum, and each includes an open end and a closed end. The suction housing member 12 has a peripheral wall including a suction port (not shown). The suction port is connected to an external refrigerant circuit (not shown). The discharge housing member 11 includes a discharge port 14 connected to the external refrigerant circuit. The suction housing member 12 accommodates a compression unit 15 (indicated by the broken lines in FIG. 1A), which compresses refrigerant, and an electric motor 16, which drives the compression unit 15. Although not shown in the drawings, the compression unit 15 of the present embodiment includes a fixed scroll, which is fixed in the suction housing member 12, and a movable scroll, which is engaged with the fixed scroll.

A stator 17 is fixed to the inner surface of the suction housing member 12. The stator 17 includes a stator core 17a, which is fixed to the inner surface of the suction housing member 12, and coils 17b, which are wound around teeth (not shown) of the stator core 17a. A rotatable rotation shaft 19 extends through the stator 17 in the suction housing member 12. A rotor 18 is fixed to the rotation shaft 19.

The suction housing member 12 has an end wall 12a to which a resin cover 22 is coupled. The cover 22 is cylindrical and includes an open end and a closed end. A planar coupling base 21 is arranged between the suction housing member 12 and the cover 22. The coupling base 21 is made of a metal, preferably aluminum. The coupling base 21 is coupled to the end wall 12a of the suction housing member 12. The coupling base 21 is thermally coupled to the suction housing member 12. The coupling base 21 forms a portion of the suction housing member 12 (housing H).

The cover 22 and the coupling base 21 define an accommodation chamber 21a. The accommodation chamber 21a accommodates a motor driving circuit 20 that drives the electric motor 16. The motor driving circuit 20 is connected to the electric motor 16 by wires (not shown). The motor driving circuit 20 is coupled to the surface of the coupling base 21 opposite to the end wall 12a. Thus, in the present embodiment, the compression unit 15, the electric motor 16, and the motor driving circuit 20 are arranged in this order along the axis L of the rotation shaft 19 (in the axial direction).

A shield 23, which is formed from a thin plate, is fixed to the cover 22. The shield 23 is made of a metal, preferably aluminum. The cover 22 and the shield 23 are stacked together. The shield 23 is located at the inner side of the cover 22.

The cover 22 includes a resin circumferential wall 22a and a resin lid 22b. The resin circumferential wall 22a is tubular and extends in the axial direction of the rotation shaft 19. The resin lid 22b is continuous with the resin circumferential wall 22a and extends perpendicular to the resin circumferential wall 22a.

As shown in FIG. 1B, the inner surface of the resin lid 22b includes a flat first surface 221b and a flat second surface 222b, which is closer to the end wall 12a of the suction housing member 12 than the first surface 221b.

As shown in FIG. 1A, the shield 23 includes a shield circumferential wall 23a and a shield lid 23b. The shield circumferential wall 23a is tubular and extends in the axial direction of the rotation shaft 19. The shield lid 23b is continuous with the shield circumferential wall 23a and extends perpendicular to the shield circumferential wall 23a. The shield circumferential wall 23a extends along the inner surface of the resin circumferential wall 22a.

As shown in FIG. 1B, the shield lid 23b includes a first shield lid portion 231b, which extends along the first surface 221b of the resin lid 22b, and a second shield lid portion 232b, which extends along the second surface 222b of the resin lid 22b. The shield 23 extends over the entire inner surface of the cover 22 and blocks the electromagnetic noise transmitted through the cover 22.

The surface of the coupling base 21 opposite to the end wall 12a of the suction housing member 12 includes a plurality of bosses 21f (only one shown in FIG. 1B) extending in the axial direction of the rotation shaft 19. Each boss 21f includes a flat distal end that is in contact with the inner surface of the second shield lid portion 232b. Each boss 21f includes a through hole 21h.

The cover 22 and the shield 23 include an insertion hole 25 into which a bolt 24 is insertable. The insertion hole 25 includes a first insertion hole 25a, which is formed in the resin lid 22b, and a second insertion hole 25b, which is formed in the second shield lid portion 232b. The first insertion hole 25a has a larger diameter than the second insertion hole 25b. The first insertion hole 25a is aligned with the second insertion hole 25b. The bolt 24 includes a threaded rod 24a and a head 24b, which is located at one end of the rod 24a.

A spacer 27 is arranged between the head 24b of the bolt 24 and the second shield lid portion 232b. The spacer 27 is made of a metal, preferably aluminum, and forms a portion of the shield 23. The spacer 27 includes a flat end wall 27a and a tubular portion 27b extending from the periphery of the end wall 27a perpendicular to the end wall 27a. The end wall 27a includes an insertion hole 27h into which the rod 24a of the bolt 24 is insertable. The rod 24a is extended through the first insertion hole 25a, the insertion hole 27h, the second insertion hole 25b, and the through hole 21h and fastened to the end wall 12a of the suction housing member 12. This couples the cover 22 and the shield 23 to the end wall 12a of the suction housing member 12. The coupling base 21 is arranged between the shield 23 and the end wall 12a.

The first surface 221b of the resin lid 22b includes an annular groove 28. An accommodation recess 29 is formed between the first surface 221b of the resin lid 22b and the second shield lid portion 232b. The annular groove 28 receives the tubular portion 27b of the spacer 27. The accommodation recess 29 receives the end wall 27a of the spacer 27. The depths of the annular groove 28 and the accommodation recess 29 are set such that when the tubular portion 27b of the spacer 27 is inserted into the annular groove 28, the surface of the end wall 27a of the spacer 27 opposite to the tubular portion 27b is flush with the second surface 222b of the resin lid 22b. Thus, the end wall 27a does not protrude from the second surface 222b toward the end wall 12a of the suction housing member 12, and the end wall 27a is accommodated in the accommodation recess 29. The tubular portion 27b, which is the rim of the spacer 27, is located between the annular groove 28 and the second shield lid portion 232b.

The resin lid 22b includes a seal accommodation groove 30 located at the inner side of the annular groove 28. The seal accommodation groove 30 is annular and in communication with the annular groove 28 and the accommodation recess 29. The seal accommodation groove 30 accommodates an annular sealing member 31 surrounding the first insertion hole 25a. The sealing member 31 is held between the inner surface of the tubular portion 27b of the spacer 27 and the wall of the seal accommodation groove 30 that faces the inner surface of the tubular portion 27b. Thus, the sealing member 31 is compressed in a direction perpendicular to the axis of the rod 24a of the bolt 24. Accordingly, the sealing member 31 is arranged between the shield 23 and the cover 22 in the tubular portion 27b. The spacer 27 is arranged between the sealing member 31 and the shield 23. The sealing member 31 seals the gap between the shield 23 and the cover 22.

The head 24b of the bolt 24 is located in the first insertion hole 25a. A washer 24c is arranged between the end wall 27a of the spacer 27 and the head 24b in the axial direction of the rod 24a of the bolt 24. The washer 24c, which is made of a metal, preferably aluminum, surrounds the rod 24a. The washer 24c seals the gap between the end wall 27a of the spacer 27 and the head 24b of the bolt 24. The section of the second shield lid portion 232b surrounding the second insertion hole 25b is located between the head 24b of the bolt 24 and the boss 21f. The axial force of the bolt 24 is applied to this section through the spacer 27 without being applied to the cover 22.

The operation of the present embodiment will now be described.

The sealing member 31 is arranged between the cover 22 and the spacer 27. The sealing member 31 seals the gap between the cover 22 and the spacer 27. This ensures the sealing between the shield 23 and the cover 22. As a result, the sealing member 31 blocks entry of foreign matter such as water and dust into the accommodation chamber 21a through the gap between the shield 23 and the cover 22. Further, the sealing member 31 surrounds the first insertion hole 25a. This blocks entry of foreign matter from the first insertion hole 25a into the accommodation chamber 21a through the gap between the shield 23 and the cover 22 when coupling the cover 22 and the shield 23 to the suction housing member 12 with the bolt 24.

The section of the second shield lid portion 232b surrounding the second insertion hole 25b is held between the head 24b of the bolt 24 and the boss 21f. The axial force of the bolt 24 is applied to this section through the spacer 27 and not applied to the cover 22. When coupling the cover 22 and the shield 23 to the suction housing member 12 with the bolt 24, the cover 22 is not held between the head 24b and the boss 21f. Thus, the axial force of the bolt 24 does not deform the cover 22. This avoids deterioration in the sealing of the suction housing member 12 with the cover 22 and the shield 23 that would be caused when the cover 22 deforms and loosens the bolt 24.

The advantages of the present embodiment will now be described.

(1) The sealing member 31, which blocks entry of foreign matter into the accommodation chamber 21a through the gap between the shield 23 and the cover 22, is arranged between the shield 23 and the cover 22. The sealing member 31 ensures the sealing between the shield 23 and the cover 22. As a result, the sealing member 31 blocks entry of foreign matter such as water and dust into the accommodation chamber 21a through the gap between the shield 23 and the cover 22.

(2) The sealing member 31 surrounds the first insertion hole 25a. This blocks entry of foreign matter from the first insertion holes 25a into the accommodation chamber 21a through the gap between the shield 23 and the cover 22 when coupling the cover 22 and the shield 23 to the suction housing member 12.

(3) The section of the second shield lid portion 232b surrounding the second insertion hole 25b is held between the head 24b of the bolt 24 and the boss 21f. The axial force of the bolt 24 is applied to this section through the spacer 27 and not applied to the cover 22. When coupling the cover 22 and the shield 23 to the suction housing member 12 with the bolt 24, the cover 22 is not held between the head 24b and the boss 21f. Thus, the axial force of the bolt 24 does not deform the cover 22. This avoids deterioration in the sealing of the suction housing member 12 with the cover 22 and the shield 23 that would be caused when the cover 22 deforms and loosens the bolt 24.

(4) The aluminum spacer 27, which forms a portion of the shield 23, is arranged between the head 24b of the bolt 24 and the second shield lid portion 232b. The spacer 27 receives the axial force of the bolt 24. The rim of the spacer 27 is located between the shield 23 and the cover 22, and the sealing member 31 is located between the cover 22 and the spacer 27. Thus, the section of the second shield lid portion 232b surrounding the second insertion hole 25b receives the axial force of the bolt 24 through the spacer 27 and the washer 24c. Further, the rim of the spacer 27 arranged between the shield 23 and the cover 22 enlarges the area of the second shield lid portion 232b that receives the axial force of the bolt 24 compared to a structure that does not use the spacer 27. In such a structure, the head 24b of the bolt 24 would be in contact with the section of the second shield lid portion 232b surrounding the second insertion hole 25b. This limits deformation of the second shield lid portion 232b caused by the axial force of the bolt 24 and avoids deterioration in the sealing of the suction housing member 12 with the cover 22 and the shield 23 that would be caused when the cover 22 deforms and loosens the bolt 24. In addition, the sealing member 31 blocks entry of foreign matter into the accommodation chamber 21a through the gap between the cover 22 and the spacer 27.

(5) The spacer 27 includes the end wall 27a and the tubular portion 27b. The rod 24a of the bolt 24 extends through the end wall 27a. The sealing member 31 is arranged in the tubular portion 27b. The cover 22 includes the annular groove 28 that receives the spacer 27. The spacer 27, which includes the end wall 27a and the tubular portion 27b, has higher rigidity than a flat spacer. Further, the sealing member 31 can be arranged in the tubular portion 27b before inserting the spacer 27 into the annular groove 28 of the cover 22. This facilitates the coupling of the spacer 27 to the cover 22.

(6) The sealing member 31 is compressed in a direction perpendicular to the axis of the bolt 24. If the sealing member 31 were compressed in the axial direction of the bolt 24, for example, the sealing member 31 would produce a resilient force that acts to restore the original shape of the sealing member 31. This would create a gap between the shield 23 and the cover 22. The present embodiment avoids such a problem.

It should be apparent to those skilled in the art that the present invention may be embodied in many other specific forms without departing from the spirit or scope of the invention. Particularly, it should be understood that the present invention may be embodied in the following forms.

Figure 2:
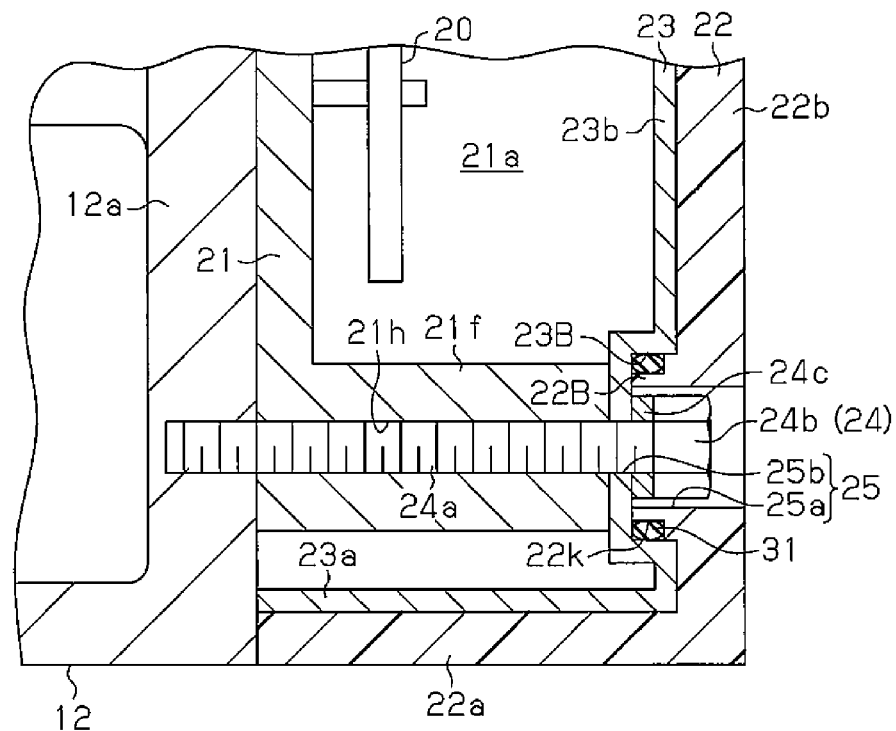
FIG. 2 is an enlarged cross-sectional view showing a bolt in another embodiment.

As shown in FIG. 2, the spacer 27 may be omitted. In this case, the inner surface of the resin lid 22b includes a projection 22B projecting toward the end wall 12a of the suction housing member 12. The periphery of the projection 22B includes an annular cut out part 22k that receives the sealing member 31. The shield lid 23b includes a fitting recess 23B into which the projection 22B is fitted. The sealing member 31 is held between the inner surface of the fitting recess 23B and the cut out part 22k. This compresses the sealing member 31 in a direction perpendicular to the axis of the rod 24a of the bolt 24. This structure eliminates the need for arranging a sealing member in the insertion hole 25, for example, to block entry of foreign matter into the accommodation chamber 21a through the gap between the shield 23 and the cover 22. The absence of such a sealing member in the insertion hole 25 allows the bolt 24 to be sufficiently embedded in the insertion hole 25. This reduces the amount the bolt 24 is projected from the cover 22.

Figure 3:
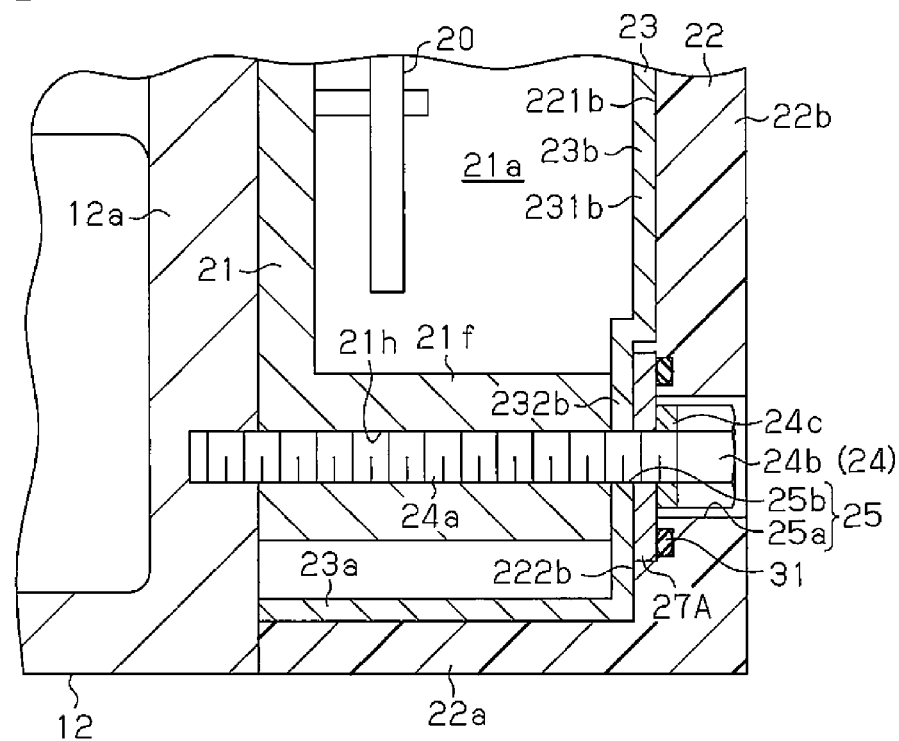
FIG. 3 is an enlarged cross-sectional view showing a bolt in a further embodiment.

As shown in FIG. 3, the sealing member 31 may be held between a flat spacer 27A and the resin lid 22b and compressed in the axial direction of the bolt 24.

Figure 4:
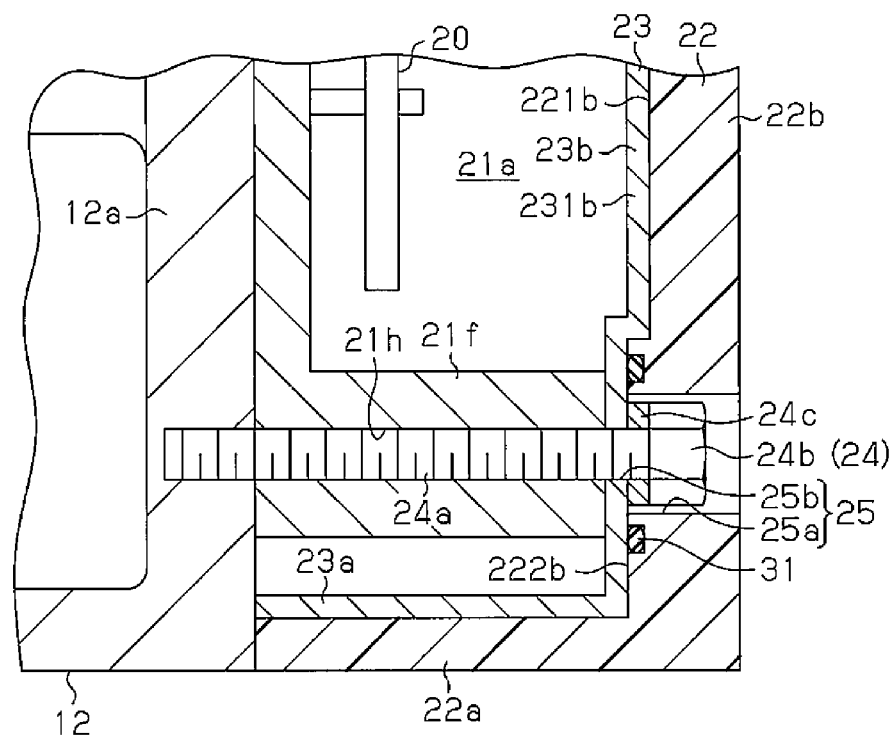
FIG. 4 is an enlarged cross-sectional view showing a bolt in a yet another embodiment.

As shown in FIG. 4, the spacer 27 may be omitted, and the sealing member 31 may be held between the second shield lid portion 232b and the resin lid 22b and compressed in the axial direction of the bolt 24.

The sealing member 31 may be compressed in a direction that intersects the axis of the bolt 24.

The shield 23 may be arranged on the outer side of the cover 22.

An additional resin portion may be arranged at the inner side of the shield 23.

The shield 23 may be made of a conductive material such as iron and copper.

The coupling base 21 may be omitted.

The washer 24c may be omitted. In this case, the spacer 27 functions as a washer.

The annular groove 28 may accommodate the tubular portion 27b and the sealing member 31. That is, the annular groove 28 and the seal accommodation groove 30 may be equal in depth so that a step is not formed between the annular groove 28 and the seal accommodation groove 30.

The compression unit 15, the electric motor 16, and the motor driving circuit 20 do not have to be arranged in this order in the axial direction of the rotation shaft 19. For example, the cover 22 may be fixed to the circumferential wall of the suction housing member 12, and the motor driving circuit 20 may be accommodated in an accommodation chamber defined by the circumferential wall of the suction housing member 12 and the cover 22.

The compression unit 15 may be of a piston type or a vane type, for example.

The present examples and embodiments are to be considered as illustrative and not restrictive and the invention is not to be limited to the details given herein, but may be modified within the scope and equivalence of the appended claims.

The invention claimed is:

1. A motor-driven compressor comprising:
a metal housing accommodating a compression unit and an electric motor;
a resin cover coupled to the metal housing, wherein the resin cover and the metal housing define an accommodation chamber that accommodates a motor driving circuit that drives the electric motor;
a metal shield that is fixed to the resin cover and blocks electromagnetic noise, wherein the metal shield and the resin cover are stacked together; and
a sealing member located between the metal shield and the resin cover, wherein the sealing member blocks entry of foreign matter into the accommodation chamber, wherein:
the resin cover includes an annular accommodation groove or an annular cut out part that forms a space enclosed by the metal shield and the resin cover so that the sealing member is disposed in the space,
each of the resin cover and the metal shield includes an insertion hole,
a bolt is inserted through the insertion holes of the resin cover and the metal shield and couples the resin cover and the metal shield to the metal housing,
the sealing member is annular and surrounds the insertion hole of the resin cover,
the bolt includes a head and a rod,
the metal shield includes a section surrounding the insertion hole of the metal shield which is located between the head of the bolt and the metal housing, and the bolt applies an axial force to the section of the metal shield surrounding the insertion hole of the metal shield without applying the axial force to the resin cover; and
a metal spacer forming a portion of the metal shield, wherein:
the metal spacer is located between the head of the bolt and the metal shield,
the rod of the bolt extends through the metal spacer,
the metal spacer receives the axial force of the bolt and includes a rim located between the metal shield and the resin cover, and
the sealing member is located between the resin cover and the metal spacer.

2. The motor-driven compressor according to claim 1, wherein
the metal spacer includes a tubular portion and an end wall,
the rod of the bolt extends through the end wall of the metal spacer,
the sealing member is located in the tubular portion of the metal spacer,
the resin cover includes an annular groove, and the tubular portion of the spacer is inserted into the annular groove.

3. The motor-driven compressor according to claim 1, wherein
the sealing member is compressed in a direction intersecting an axis of the bolt.

4. The motor-driven compressor according to claim 1, wherein the metal shield is located at an inner side of the resin cover.

5. The motor-driven compressor according to claim 1, further comprising a rotation shaft accommodated in the metal housing and rotated integrally with a rotor of the electric motor, wherein the compression unit, the electric motor, and the motor driving circuit are arranged in this order along an axis of the rotation shaft.

* * * * *